(12) United States Patent
Lockhart et al.

(10) Patent No.: US 10,129,322 B2
(45) Date of Patent: Nov. 13, 2018

(54) METHOD AND SYSTEM FOR DETERMINING BROWSER COMPATIBILITY

(71) Applicant: D2L CORPORATION, Kitchener (CA)

(72) Inventors: David Lockhart, Kitchener (CA); Jeffrey Geurts, Kitchener (CA)

(73) Assignee: D2L Corporation, Kitchener, ON (CA)

( * ) Notice: Subject to any disclaimer, the term of this patent is extended or adjusted under 35 U.S.C. 154(b) by 437 days.

(21) Appl. No.: 14/560,380

(22) Filed: Dec. 4, 2014

(65) Prior Publication Data

US 2016/0094613 A1    Mar. 31, 2016

Related U.S. Application Data

(60) Provisional application No. 62/056,804, filed on Sep. 29, 2014.

(51) Int. Cl.

| | |
|---|---|
| *G06F 15/16* | (2006.01) |
| *H04L 29/08* | (2006.01) |
| *G06F 17/30* | (2006.01) |
| *G06F 9/445* | (2018.01) |
| *G06F 8/65* | (2018.01) |

(52) U.S. Cl.
CPC .............. *H04L 67/02* (2013.01); *G06F 8/65* (2013.01); *G06F 9/44526* (2013.01); *G06F 9/44536* (2013.01); *G06F 17/30896* (2013.01); *G06F 17/30899* (2013.01); *G06F 17/30905* (2013.01)

(58) Field of Classification Search
CPC ....... H04L 67/02; G06F 8/71; G06F 9/44526; G06F 9/44536; G06F 14/30899
USPC .......................................................... 709/217
See application file for complete search history.

(56) References Cited

U.S. PATENT DOCUMENTS

| | | | | |
|---|---|---|---|---|
| 6,119,137 | A * | 9/2000 | Smith | .................. G06F 17/3089 |
| | | | | 707/E17.116 |
| 7,269,853 | B1 * | 9/2007 | Dunn | ..................... H04L 63/102 |
| | | | | 726/27 |
| 7,565,696 | B1 * | 7/2009 | Njemanze | ............... H04L 63/20 |
| | | | | 709/224 |

(Continued)

*Primary Examiner* — Tauqir Hussain
(74) *Attorney, Agent, or Firm* — Gowling WLG (Canada) LLP; Neil W. Henderson (57) ABSTRACT

A method and system for determining browser compatibility are provided. The method includes: receiving a request for electronic content from a user device; determining browser data associated with the user device; determining accepted browser versions associated with the requested content; determining whether the browser data is compatible with the accepted browser versions; if the browser data is compatible, loading the electronic content; otherwise, determining user factors associated with the user device; generating a notification; and transmitting, the notification. The system includes: a connection module configured to receive a request for electronic content; a compatibility module configured to determine browser data, determine accepted browser versions, determine whether the browser data is compatible with the accepted browser versions and if the browser data is compatible, allow for the loading of the electronic content; and a notification module configured to determine user factors associated with the user device, and generate a notification.

18 Claims, 5 Drawing Sheets

(56) References Cited

U.S. PATENT DOCUMENTS

| | | | |
|---|---|---|---|
| 7,644,438 B1* | 1/2010 | Dash | H04L 63/0218 703/17 |
| 8,959,209 B1* | 2/2015 | D | G06F 17/30899 707/723 |
| 2002/0184363 A1* | 12/2002 | Viavant | H04L 12/2602 709/224 |
| 2007/0101433 A1* | 5/2007 | Louch | G06F 21/552 726/25 |
| 2008/0222628 A1* | 9/2008 | Batra | G06F 8/60 717/171 |
| 2009/0077191 A1* | 3/2009 | Bristow | H04L 12/5855 709/207 |
| 2010/0107018 A1* | 4/2010 | Benenson | G06F 11/324 714/57 |
| 2010/0115123 A1* | 5/2010 | Airamo | H04H 20/40 709/234 |
| 2010/0162364 A1* | 6/2010 | Roth | G06F 21/604 726/4 |
| 2013/0104060 A1* | 4/2013 | Chandra | G06F 17/30899 715/760 |
| 2014/0160941 A1* | 6/2014 | Hui | H04W 24/10 370/241 |
| 2015/0189044 A1* | 7/2015 | Pastor Perales | H04L 67/26 709/217 |
| 2015/0334182 A1* | 11/2015 | Wu | H04L 67/1095 707/620 |
| 2016/0241488 A1* | 8/2016 | Karpov | G06F 17/3089 |

\* cited by examiner

METHOD AND SYSTEM FOR DETERMINING BROWSER COMPATIBILITY

FIELD

The present disclosure relates generally to Internet browsers. More particularly, the present disclosure relates to method and system for browser compatibility.

BACKGROUND

Many users access the Internet through a variety of channels and use a variety of Internet browsers. Internet browsers are frequently updated with newer versions offering further features and greater functionality for the users. Web developers and websites may want to take advantage of the new features and functionality to allow the websites and web pages to provide the greatest impact to the user.

Although web pages may be developed to take advantage of newer versions of browsers, there can also be a need to continue support for older versions to allow users with previous versions of browsers to render the pages without any missing functionality. In some cases, users may not realize that the browser they are using is out of date and wonder why websites and web pages are not being displayed properly and are missing functionality.

It is, therefore, desirable to provide an improved method and system for determining browser compatibility with electronic content such as websites and web pages.

The above information is presented as background information only to assist with an understanding of the present disclosure. No determination has been made, and no assertion is made, as to whether any of the above might be applicable as prior art with regard to the present disclosure.

SUMMARY

In a first aspect, the present disclosure provides a method for determining browser compatibility, the method includes: receiving a request for electronic content from a user device; determining browser data associated with the user device; determining accepted browser versions associated with the requested content; determining whether the browser data is compatible with the accepted browser versions associated with the requested content; if the browser data is compatible, loading the electronic content; otherwise, determining user factors associated with the user device; generating a notification based on the user factors; and transmitting, to the user device, the notification stating the browser is incompatible.

In a particular case, the browser data may include data from the group consisting of: browser type, browser version, compatibility mode, and plug-ins available.

In another particular case, if the browser data is incompatible, the method may include: determining the role of the user from the user factors; determining whether the user has access to amend the browser settings based on the role of the user; and if the user does not have access; sending a notification to an administrator or super-user of the user device instead of the user.

In still another particular cause, the user factors may include data from the group consisting of: user language, user location, user device type and user role.

In yet another particular case, the notification may include a link to further information regarding the compatibility of the browser.

In still yet another particular case, the link to further information may be determined based on user factors.

In a particular case, the notification may provide a walkthrough for resolving compatibility issue between the browser and the electronic content.

In another particular case, determining the accepted browser versions may include: determining a length of time versions of a type of browser is supported; comparing the length of time each version has been released; and determining which versions are currently accepted browser versions based on the comparing.

In still another particular case, the notification may only appear on a first request from a user device to access the requested content.

In yet another particular case, after the notification has been dismissed, the method may transmit a reminder notification to the user device based on predetermined thresholds.

In another aspect, there is provided a system for determining browser compatibility, the system includes: a connection module configured to receive a request for electronic content from a user device; a compatibility module configured to determine browser data associated with the user device, determine accepted browser versions associated with the requested content, determine whether the browser data is compatible with the accepted browser versions associated with the requested content and if the browser data is compatible, allow for the loading of the electronic content; and a notification module configured to determine user factors associated with the user device, generate a notification based on the user factors; and transmit, to the user device, the notification stating the browser is incompatible if the browser data is incompatible.

In a particular case, the browser data may include data from the group consisting of: browser type, browser version, compatibility mode, and plug-ins available.

In another particular case, if the browser data is incompatible, the notification module may be further configured to: determine the role of the user from the user factors; determine whether the user has access to amend the browser settings based on the role of the user; and if the user does not have access; send a notification to an administrator or super-user of the user device instead of the user.

In still another particular case, the user factors may include data from the group consisting of: user language, user location, user device type and user role.

In yet another particular case, the notification may include a link to further information regarding the compatibility of the browser.

In still yet another particular case, the link to further information may be determined based on user factors.

In another particular case, the notification may provide a walkthrough for resolving compatibility issue between the browser and the electronic content.

In still another particular case, the compatibility module, in determining the accepted browser versions, may be further configured to: determine a length of time versions of a type of browser is supported; compare the length of time each version has been released; and determine which versions are currently accepted browser versions based on the comparison.

In yet another particular case the notification may only appear on a first request from a user device to access the requested content.

In still yet another case, the notification module may be configured to, after the notification has been dismissed, transmit a reminder notification to the user device based on predetermined thresholds.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

The following description with reference to the accompanying drawings is provided to assist in the understanding of example embodiments of the invention as defined by the claims and their equivalents. The following description includes various specific details to assist in that understanding but these are to be regarded as merely examples. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding. Accordingly, it should be apparent to those skilled in the art that the following description of embodiments is provided for illustration purposes only and not for the purpose of limiting the invention as defined by the appended claims and their equivalents.

Generally, the present disclosure provides a method and system for determining browser compatibility. The version of the user's browser is determined and is compared to the versions currently supported by the electronic content the user is requesting to access, such as a website or a web page. Further browser data is retrieved to determine if the user is in a compatibility mode, or other viewing mode that may reduce the features and/or functionality of the electronic content. If the system determines that the user is viewing the page under less than preferred conditions, the system notifies the user of the compatibility issues. In some cases, the system may determine further user data, for example the user's location, user's language, or the like. The system may then provide further information in the notification directing the user to further information based on the user data.

Users may use a variety of browsers to access the Internet, the most common types of browsers tend to be: Microsoft™ Internet Explorer™, Google™ Chrome™, Apple™ Safari™ and Mozilla™ Firefox™. Some of these browsers may push upgrades or updates to their users while others may notify users of upgrades or updates but allow each user to decide whether to upgrade the browser or to remain on a previous version of the browser.

In some cases, individual users of the Internet browser may be using a browser with limited rights to upgrade or modify the browser, for example, a student in a computer lab, an employee on an employer's computer, or the like. The user may have limited rights in upgrading and updating software and the decision to upgrade the browser may be made by an Information Technology (IT) department, by an administrator, a super-user or the like. In these cases, the individual user may not know what version of the browser is being used by the computer or whether the version is up to date, or no longer supported in the web development environment.

Figure 1:
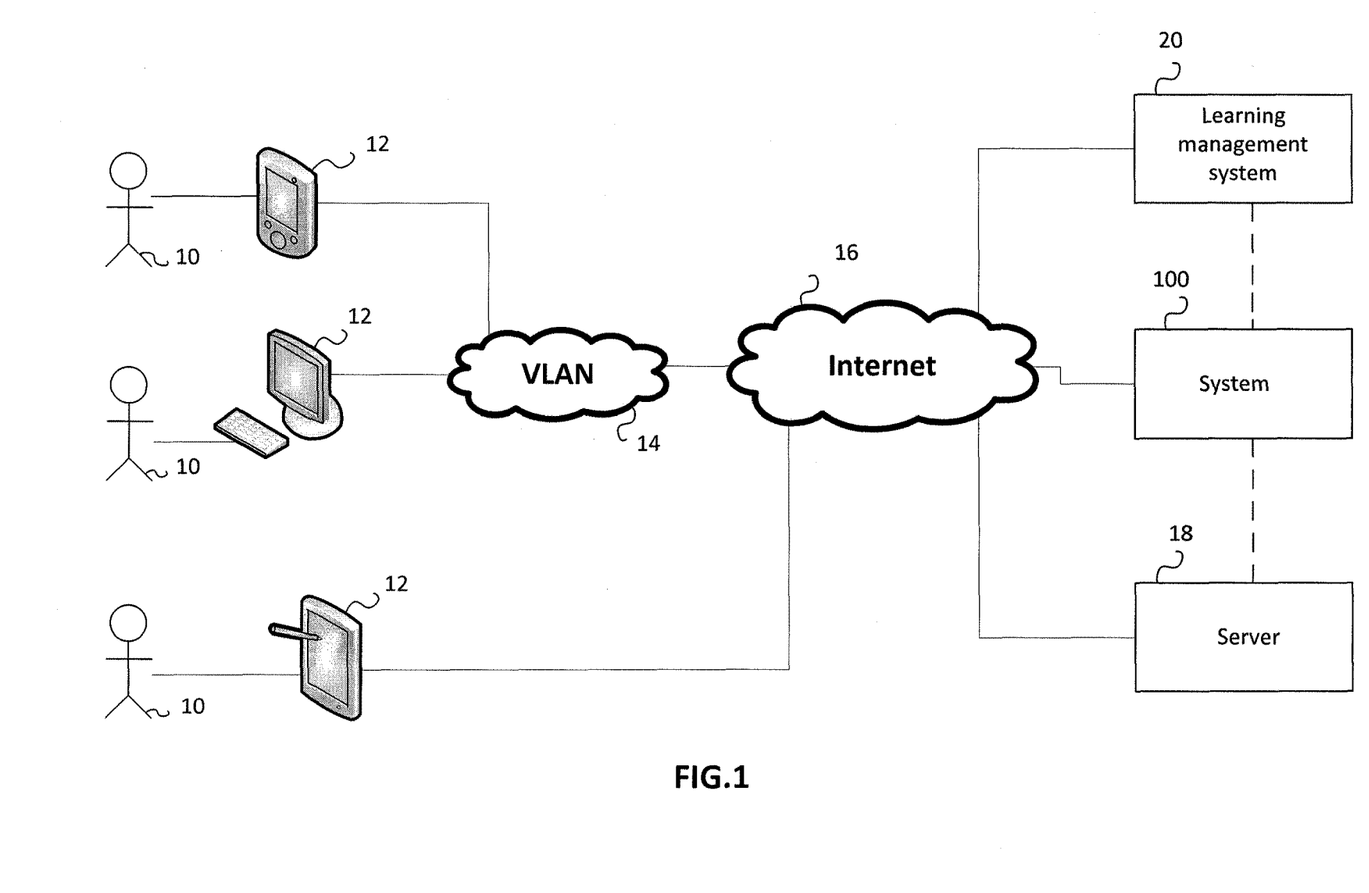
FIG. 1 illustrates an example environment for a system for determining browser compatibility according to an embodiment.

FIG. 1 illustrates an example environment for a system 100 for determining browser compatibility. Users 10 access Internet browsers on user devices 12, for example, smart phones, tablets, laptops, netbooks, desktops, or the like. The user devices 12 may be connected to an Intranet or Virtual Local Area Network (VLAN) 16, for example, users accessing browsers via an internal computer lab, through an employer's network or the like. The user devices 12 access the Internet 16 or may access an alternative network via the Internet browser. Via the Internet access, the user device may connect to a network device, for example, a server 18, a learning management system 20 or the like, to view electronic content the user wishes to access.

The system 100 for determining browser compatibility may be a separate server or other network device operatively connected to various other network devices, for example the server 18 or the learning management system 20 or may be a component or module of a network device.

Figure 2:
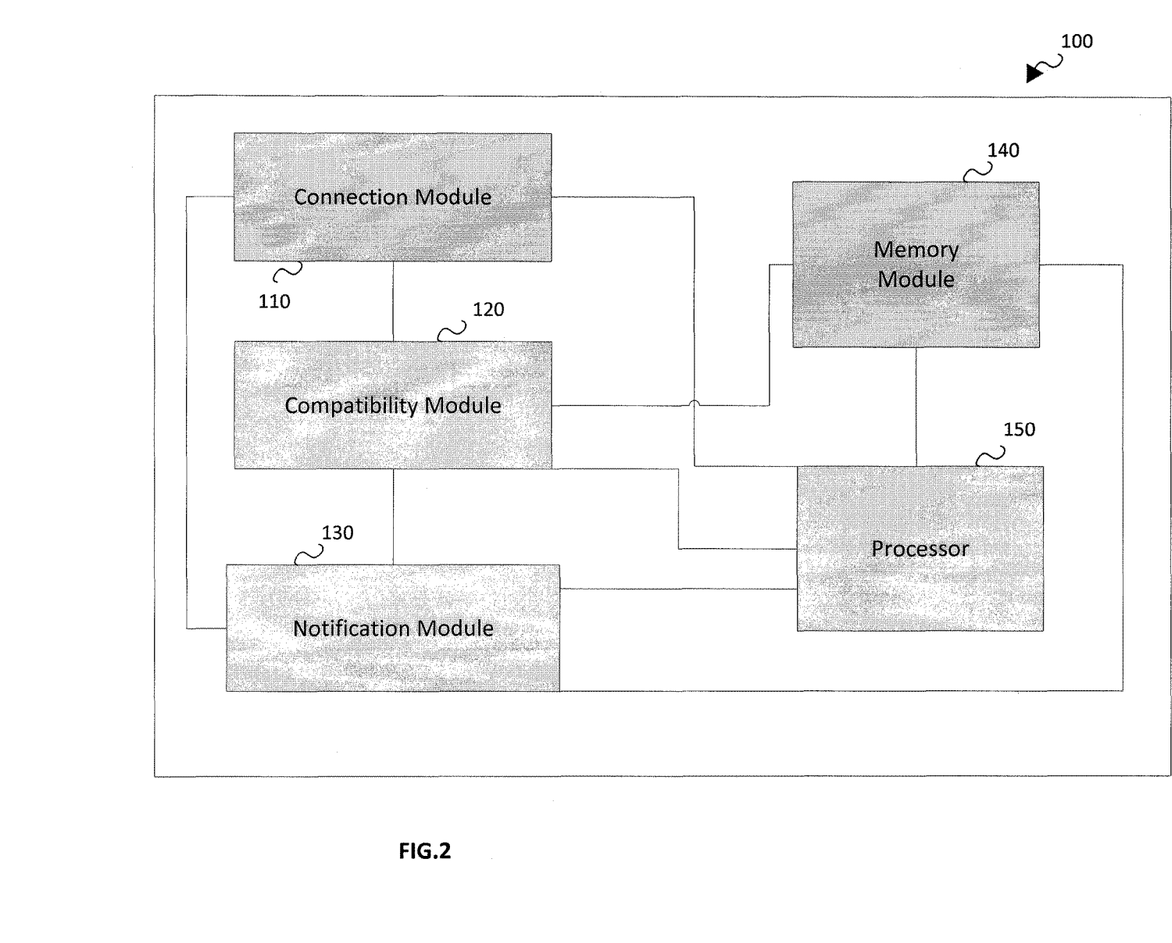
FIG. 2 illustrates a system for determining browser compatibility according to an example embodiment.

FIG. 2 illustrates an example embodiment of a system 100 for determining browser capability. The system 100 includes a connection module 110, a compatibility module 120, a notification module 130, a memory module 140 and a processor 150.

The connection module 110 is configured to receive a transmission from a user device 12. The connection module 110 is operatively connected to the compatibility module 120 and may pass the data received from the transmission to the compatibility module 120 to determine further details with respect to the content or website requested by the user, via the user device 12.

In some cases, the connection module 110 may receive a transmission, such as a request to access electronic content such as, a website or web page, from a network device, for example the server 18 or the learning management system 20, which may provide the system 100 details of the user device request. Depending on how the system 100 is operatively connected to the network device may depend on how the connection module 110 receives the transmission. It will be understood that various ways of receiving the transmission or details with respect to the user request may be appropriate depending on the configuration of the system 100 with respect to the network device.

The compatibility module 120 is configured to determine browser data from the user request. The compatibility module 120 parses the request, for example by parsing a user-agent header of the request, to determine data related to the type and version of the browser sending the user request. The compatibility module 120 may determine further browser data, for example, whether the browser is running in compatibility mode or compatibility view.

In some browsers, there may be the option for the browser to run in a compatibility mode. When being used in this mode, the browser may function as a previous version of the browser. In some cases, during web development, a web developer may select to accommodate a certain version of the browser and may identify this selection in the web page or website source code. When the browser navigates to this page, the web browser may begin to run in a compatibility mode to better render the web page or website code. In other cases, compatibility mode may be entered into based on use patterns or development patterns on websites and web pages. For example, the Internet browser may enter compatibility mode in an Intranet setting on the assumption that the Intranet may not be as frequently updated as more public web pages and web sites.

The compatibility module 120 determines supported or accepted browsers versions of the electronic content. The compatibility module 120 is further configured to determine whether the browser data is compatible with the accepted browser versions of the electronic content.

In some cases, the compatibility module 120 may retrieve data from the network device or from a database operatively connected to the network device to determine a range of supported or accepted Internet browsers and/or browser versions associated with the electronic content, for example a specific website or web page. In other cases, the system 100 may store this data locally in the memory module 140 and the compatibility module 120 may retrieve the supported Internet browser data by querying the memory module 140.

If the compatibility module 120 determines that the Internet browser is compatible, the system 100 will signal the network device to load the user requested content without further restriction. If the compatibility module 120 determines that the Internet browser may not be compatible, the compatibility module 120 will signal to the notification module 130 to provide an appropriate notification regarding the browser incompatibility with respect to the requested content.

The notification module 130 is configured to provide a notification to the user 10, via the user device 12, to inform the user of compatibility issues with the browser being used in association with the requested content. The notification module 130 is configured to determine user factors related to the user, for example, the location of the user device, the home region of the user device, the language being used, the user role, user device type, or the like. In some cases, the user's language may be determined from the user-agent header of the request for electronic content. In some cases, the user's location may be inferred using the user's IP address or GPS co-ordinates.

It is intended that with the user factors, the notification module 130 may tailor the notification to the user by, for example, creating the notification in the language used by the user, including a link, such as a hyperlink to a webpage or other electronic content, to further information in the user's language and associated with the user's location and user's device type, or the like.

In some cases, where a link is included in the notification, the link for the user's location and language may be retrieved from the memory module 140. In other cases, the link may be determined by the notification module 130 by retrieving the information page for the Internet browser being used. In still other cases, the link may be refined to direct the user to a specific version or update page if there is an appropriate corresponding page. In still other cases, the user's operating system may be determined from the user-agent header as a user factor, and the link may direct the user to a mores specific version or update page for the browser based on the operating system.

The system 100 further includes at least one processor 150, configured to execute the instructions of the other modules. In some cases, each module may include a processor. In other cases, the system 100 may be a component within a server or network device, and the processor 150 may be a central processing unit for the server or network device.

Figure 3:
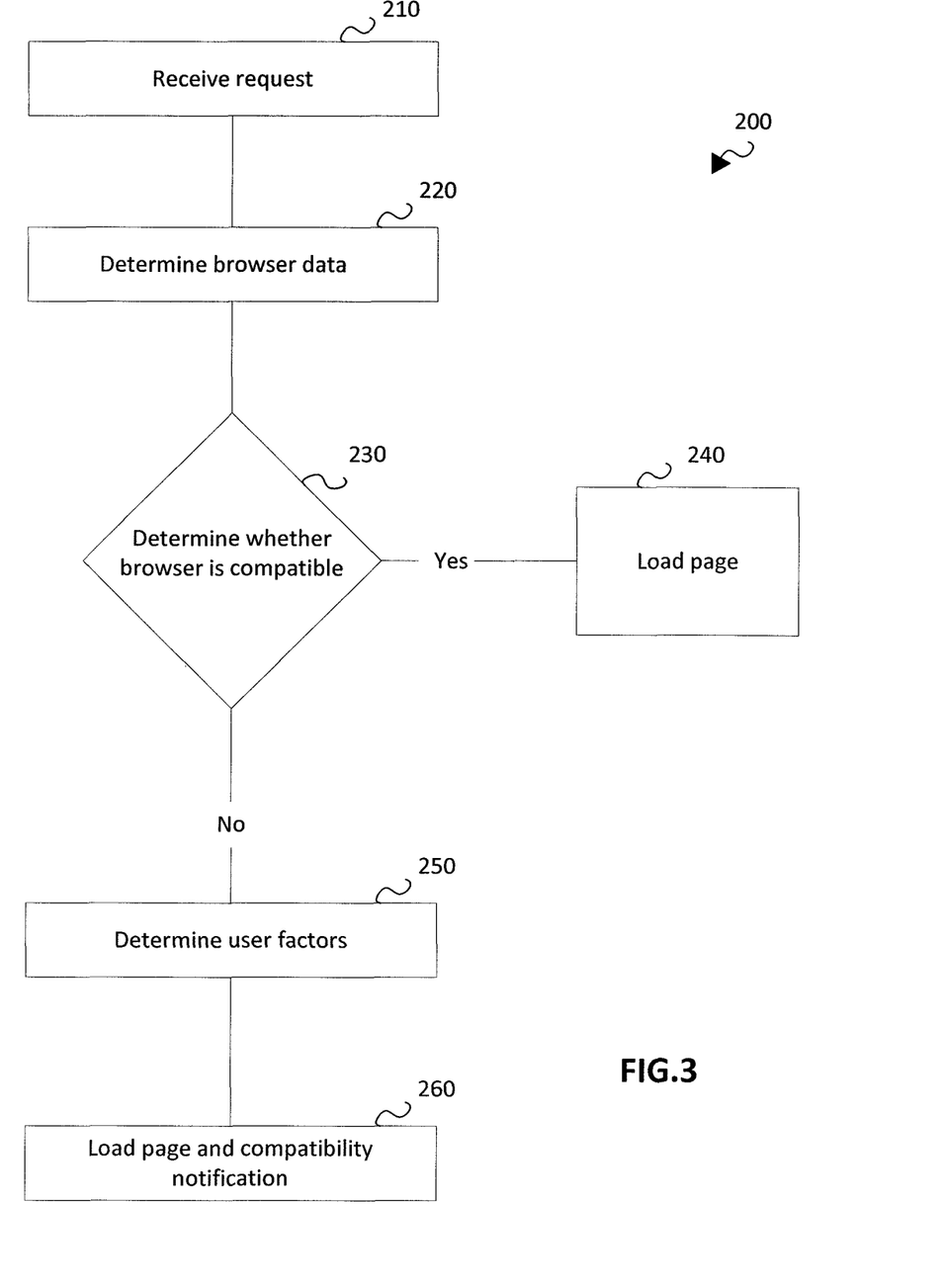
FIG. 3 is a flowchart illustrating a method for determining browser compatibility according to an example embodiment.

FIG. 3 illustrates a method 200 for determining browser compatibility according to an example embodiment.

At 210, the connection module 110 of the system 100 for determining browser compatibility receives a request to access or load electronic content, such as a web page or website, for example a login page for a learning management system.

At 220, the compatibility module 120 retrieves browser data from the user request for the electronic content. The compatibility module 120 is configured to retrieve the brand or operator of the browser and the current version being used. In some cases, the compatibility module 120 is configured to determine not only the browser version but also if the browser is running in a compatibility mode or compatibility view.

At 230, the compatibility module 120 determines whether the browser is compatible with the requested content based on the browser data. In some cases, the compatibility module 120 will compare the browser data with accepted browser versions associated with the requested content to determine whether the browser is compatible. The compatibility module 120 may retrieve this data from a memory module or may query a third party network device to determine the range of accepted browser versions.

At 240, if the compatibility module 120 determines the browser data is compatible with the accepted browser versions, the system 100 will allow the network device to load the requested content with no interference or additional review of the browser compatibility.

At 250, if the compatibility module 120 determines that the browser data is incompatible with the accepted browser version, the notification module 130 is configured to determine user factors, by retrieving the user factors from the user device or determining the user factors from a network device or learning management system which may store user factors regarding users accessing the network device or learning management system. In some case, further user factors may be determined from the user's request for the electronic content. The notification module 130 is configured to create and send a notification or compatibility warning to the user based on the browser data determined by the compatibility module 120 and based on the user factors.

At 260, the system 100 transmits a notification to the user when the web page or web site is loaded. The notification is intended to provide the user with details as to the incompatibility between the browser the user is operating and the accepted browser of the requested content.

The notification is intended to be user friendly in that it is intended that the notification module 130 determines the location and language of the user from the user factors collected and the notification is presented to the user in the user's selected language, and if any links in the notification are provided, the links are provided to an appropriate web page. For example, if it is noted that the user is in Canada and the language is set to French, the user may be redirected to a French web page in a Canadian domain, for example a .ca page, to provide the user with further information. In other cases, if the user's location is determined as U.S. and the language is English, the user may be redirected to an English page with a domain ending in .com.

Figure 4:
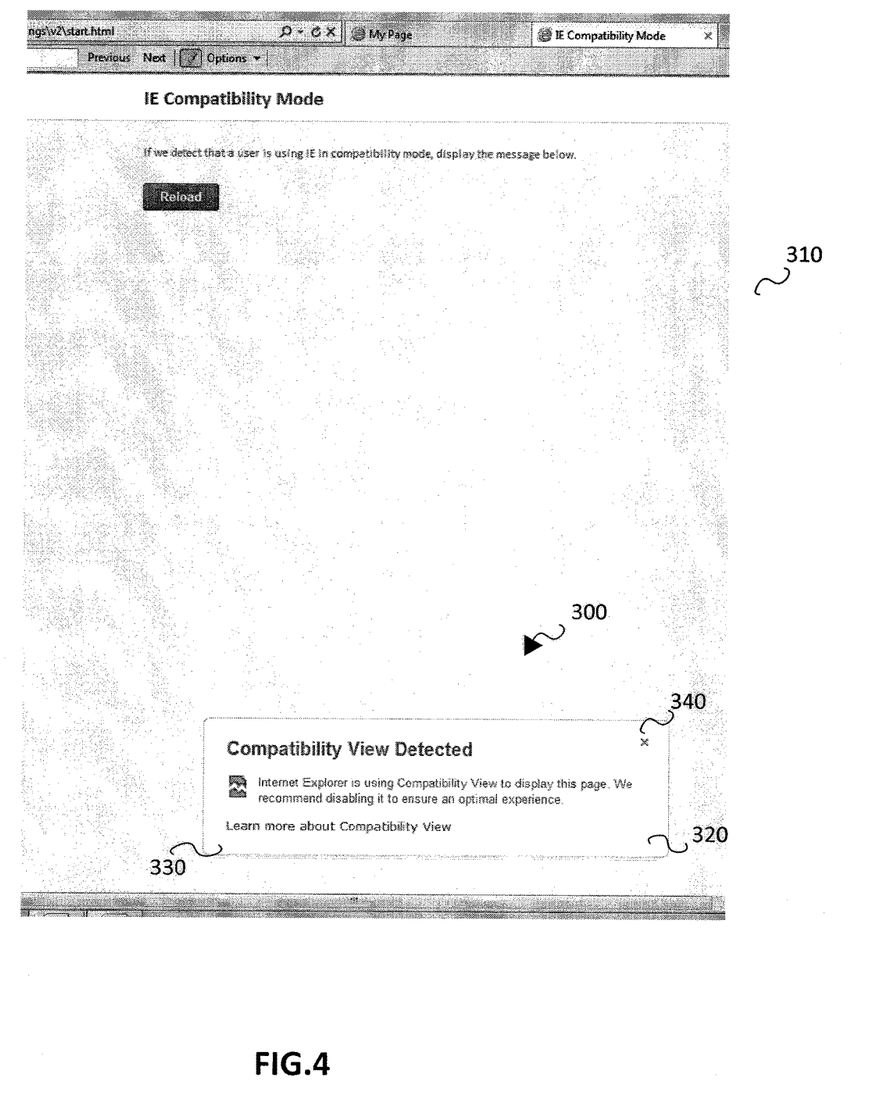
FIG. 4 is an example user message according to an example embodiment.

FIG. 4 illustrates an example notification 300 made using the system and method described herein. A web page 310 is loaded in a tab of a browser with the notification being a pop-up box 320 displayed at the bottom of the page. The notification is intended to detail the compatibility issue, in this case, the browser is using a compatibility view which may distract from the optimal viewing experience. The notification may also contain a link 330 that directs the user to further information regarding the compatibility issue. In some cases, as in the example in FIG. 4, the link may provide detail as to how to disable compatibility view in order to increase the functionality and improve the appearance of the web page or website in comparison to viewing it with an incompatible browser. The notification may also include a disable feature 340 such as an x in the corner, a cancel button, or the like, for the user to dismiss the notification.

Figure 5:
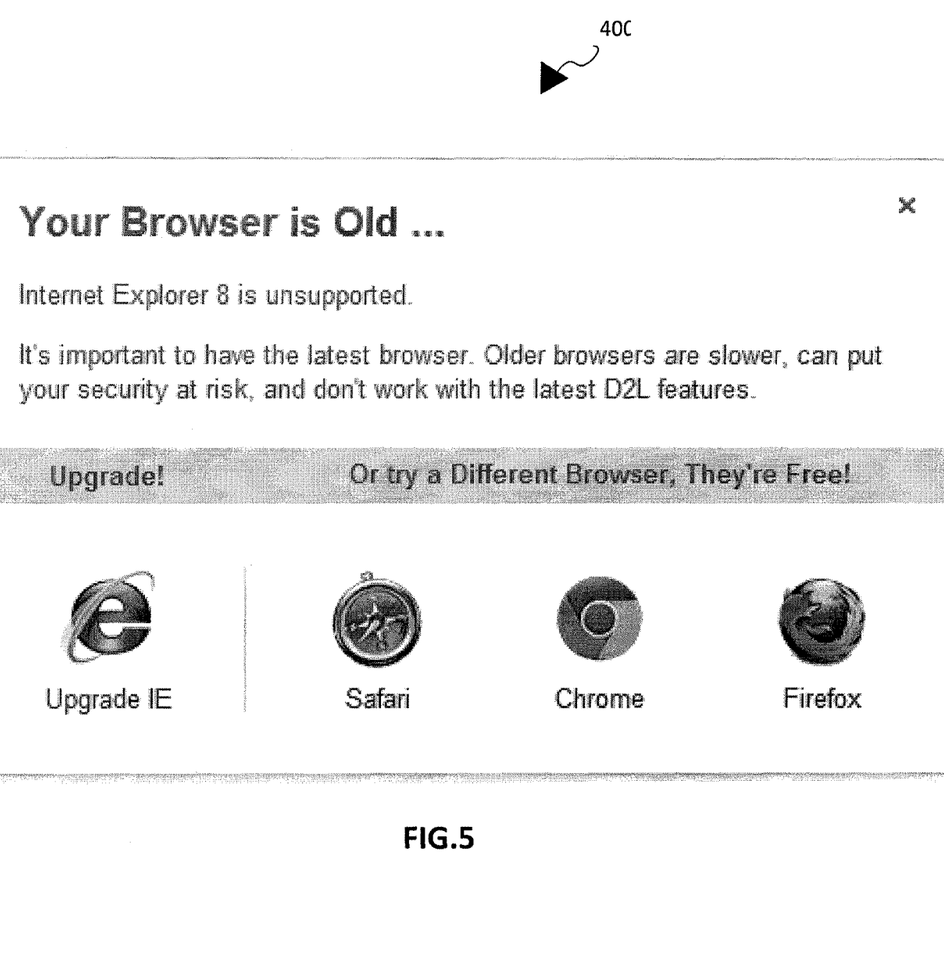
FIG. 5 is another example user message according to an alternative embodiment.

FIG. 5 illustrates another example notification 400 made using the system and method described herein. The user is provided with detail as to the browser incompatibility. The notification provides the option to upgrade the user's current browser, based on the user's browser data, or to install a different browser.

In some cases, instead of providing the user with a link to further information, the notification may contain instructions to allow the user to fix the compatibility issues without being redirected to another website. In some cases, instructions may be saved in the memory module 140 and retrieved by the notification module 130. In an example where the browser is in a compatibility view but the website supports newer versions of the browser, the notification module 130 may create a notification listing the steps to disable compatibility view. In a specific example, the notification may list the steps and include a walkthrough or further details as to how to repair the browser compatibility issues. Although providing the user with detailed instructions may allow the user to rectify the compatibility issue, it is also possible to provide a link to a specific page maintained by the operator of the Internet browser which is intended to ensure the instructions the user receive are correct in view of the version of the Internet browser the user is operating.

In an example, a user accesses an Intranet page via an Internet browser from within a computer lab of an educational institution. The user than requests to access a log-in page of a learning management system via the Internet browser. The system 100 determines the user's Internet Browser is in a compatibility view as the browser automatically entered into compatibility view as the user was accessing an Intranet page. On loading the log-in page requested by the user, the notification module 130 will also provide the user with a notification detailing the issue of the browser being in a compatibility view with the website the user wishes to access. The user can select to dismiss the notification, or log-in and ignore the message.

In some cases, the notification may only appear at the log-in time and will not reappear once the user has entered the website. In some cases, the user may be able to dismiss the message permanently so the user does not receive the message again for the specific website. In other cases, the notification may be dismissed for a single log-in session and the notification would reappear when the user re-accesses the site and is required to log-in again.

In some cases, the notification may appear in detail on the log-in page and a smaller reminder notification may appear on subsequent web pages of the website. The reminder notification may include a link for the user to access or an input feature which would allow the user to expand the notification for greater detail. In other cases, the notification may appear as an icon or another visual cue which may provide further detail to the user if the user selects the icon or visual cue. It is intended that the reminder notification be less intrusive than the notification, but continues to remind the user that there may be some compatibility issues that may result in the loss of some functionality or in an incorrect or improperly formatted web page or website.

In other cases, once a user has selected a setting with regard to the compatibility notification, the setting may be saved as a user factor, for example, in the memory module 140 or in a storage area of a network device, learning management system, or the like. In determining user factors, the system 100 may determine the previously saved user setting and determine whether or not to transmit a notification or what type of notification to transmit based on the previously saved setting.

In a specific example, where the notification module 130 may determine user role as a user factor. If it determines from the user role that the user does not have permissions to modify the browsers setting or upgrade the browser version, the notification module 130 may display a notification alerting the user to the compatibility issue and may further notify an administrator or super user of the compatibility issue via, for example, email, on-screen notification, text message, or the like. In some cases, the user may not receive any notification and the administrator receives the only notification. In other cases, the notification may include an option to contact the administrator and the user can select whether or not to contact or notify the administrator.

In some cases, the memory module 140 may store versions of browsers currently supported by specific websites. In other cases, the memory module 140 may store a length of time versions of browsers are supported, for example 1 year, 3 years, 5 years, or the like. In this case, when determining if the browser is supported, the compatibility module 120 may determine when the browser was released and how long browser versions are supported to determine whether the user's Internet browser is currently supported. In some cases, the data may not be stored in the memory module, but may be stored in the web page or website server and may be queried by the compatibility module 120. It will be understood that other ways of retrieving this information are possible and would be understood by one skilled in the art. The length of time versions of browsers are supported may vary between the browser types and may depend on how frequently the browsers are updated and new versions are created.

In a specific example, a user may log-in to a learning management system. The compatibility module 120 may determine browser data from the user request and may determine the browser is not compatible with the currently requested electronic content. The notification module 130 may determine user factors by querying the learning management system. In some cases, the user factors may include details relating to the user's enrolled courses, user's course material, user's computer lab accesses, or the like. As the user factors stored in a learning management system may include a plurality of specific user details with respect to the user's courses, grades, personal information, and the like, the notification module 130 may retrieve a plurality of user factors that may be used to generate a notification with personal detail to the user. For example, the user notification may detail computer labs accessible by the user which contain browser applications that are compatible with the currently requested electronic content.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for determining browser compatibility comprising:
    receiving a request for electronic content from a user device;
    determining browser data associated with the user device;
    determining accepted browser versions associated with the requested content, wherein the determining the accepted browser versions comprises:
        determining a length of time versions of a type of browser is supported;
        comparing the length of time each version has been released; and
        determining which versions are currently accepted browser versions based on the comparing;
    determining whether the browser data is compatible with the accepted browser versions associated with the requested content;
    if the browser data is compatible, loading the electronic content;
    otherwise,
        determining user factors associated with the user device;
        generating a notification based on the user factors, wherein the notification includes one or more of an indication that the browser is incompatible and a link associated with an upgrade to the browser;
        determining a recipient device to which the notification is to be sent based at least in part on the user factors; and
        transmitting the notification to the recipient device.

2. The method of claim 1, wherein the browser data comprise data from the group consisting of: browser type, browser version, compatibility mode, and plug-ins available.

3. The method of claim 1, if the browser data is incompatible, further comprising:
    determining the role of the user from the user factors;
    determining whether the user has access to amend the browser settings based on the role of the user; and
    if the user does not have access; sending a notification to an administrator or super-user of the user device instead of the user.

4. The method of claim 1, wherein the user factors comprise data from the group consisting of: user language, user location, user device type and user role.

5. The method of claim 1, wherein the notification includes a link to further information regarding the compatibility of the browser.

6. The method of claim 5, wherein the link to further information is determined based on user factors.

7. The method of claim 1, wherein the notification provides a walkthrough for resolving compatibility issue between the browser and the electronic content.

8. The method of claim 1, wherein the notification only appears on a first request from a user device to access the requested content.

9. The method of claim 1, further comprising, after the notification has been dismissed, transmitting a reminder notification to the user device based on predetermined thresholds.

10. A system for determining browser compatibility comprising:
    a connection module configured to receive a request for electronic content from a user device;
    a compatibility module configured to determine browser data associated with the user device, determine accepted browser versions associated with the requested content, determine whether the browser data is compatible with the accepted browser versions associated with the requested content and if the browser data is compatible, allow for the loading of the electronic content, wherein the determining the accepted browser versions comprises:
        determining a length of time versions of a type of browser is supported;
        comparing the length of time each version has been released; and
        determining which versions are currently accepted browser versions based on the comparing; and
    a notification module configured to determine user factors associated with the user device, generate a notification based on the user factors wherein the notification includes one or more of an indication that the browser is incompatible and a link associated with an upgrade to the browser; determine a recipient device to which the notification is to be sent based at least in part on the user factors; and transmit, to the user device, the notification stating the browser is incompatible if the browser data is incompatible.

11. The system of claim 10, wherein the browser data comprise data from the group consisting of: browser type, browser version, compatibility mode, and plug-ins available.

12. The system of claim 10, wherein if the browser data is incompatible, the notification module is further configured to:
- determine the role of the user from the user factors;
- determine whether the user has access to amend the browser settings based on the role of the user; and
- if the user does not have access; send a notification to an administrator or super-user of the user device instead of the user.

13. The system of claim 10, wherein the user factors comprise data from the group consisting of: user language, user location, user device type and user role.

14. The system of claim 10, wherein the notification includes a link to further information regarding the compatibility of the browser.

15. The system of claim 14, wherein the link to further information is determined based on user factors.

16. The system of claim 10, wherein the notification provides a walkthrough for resolving compatibility issue between the browser and the electronic content.

17. The system of claim 10, wherein the notification only appears on a first request from a user device to access the requested content.

18. The system of claim 10, wherein the notification module is configured to, after the notification has been dismissed, transmit a reminder notification to the user device based on predetermined thresholds.

* * * * *